J. K. STEWART.
AIR STARTER FOR AUTOMOBILE ENGINES.
APPLICATION FILED AUG. 11, 1915.

1,205,055.

Patented Nov. 14, 1916.
3 SHEETS—SHEET 1.

Witnesses:

Inventor
John K. Stewart
by Burton & Burton
his Attys.

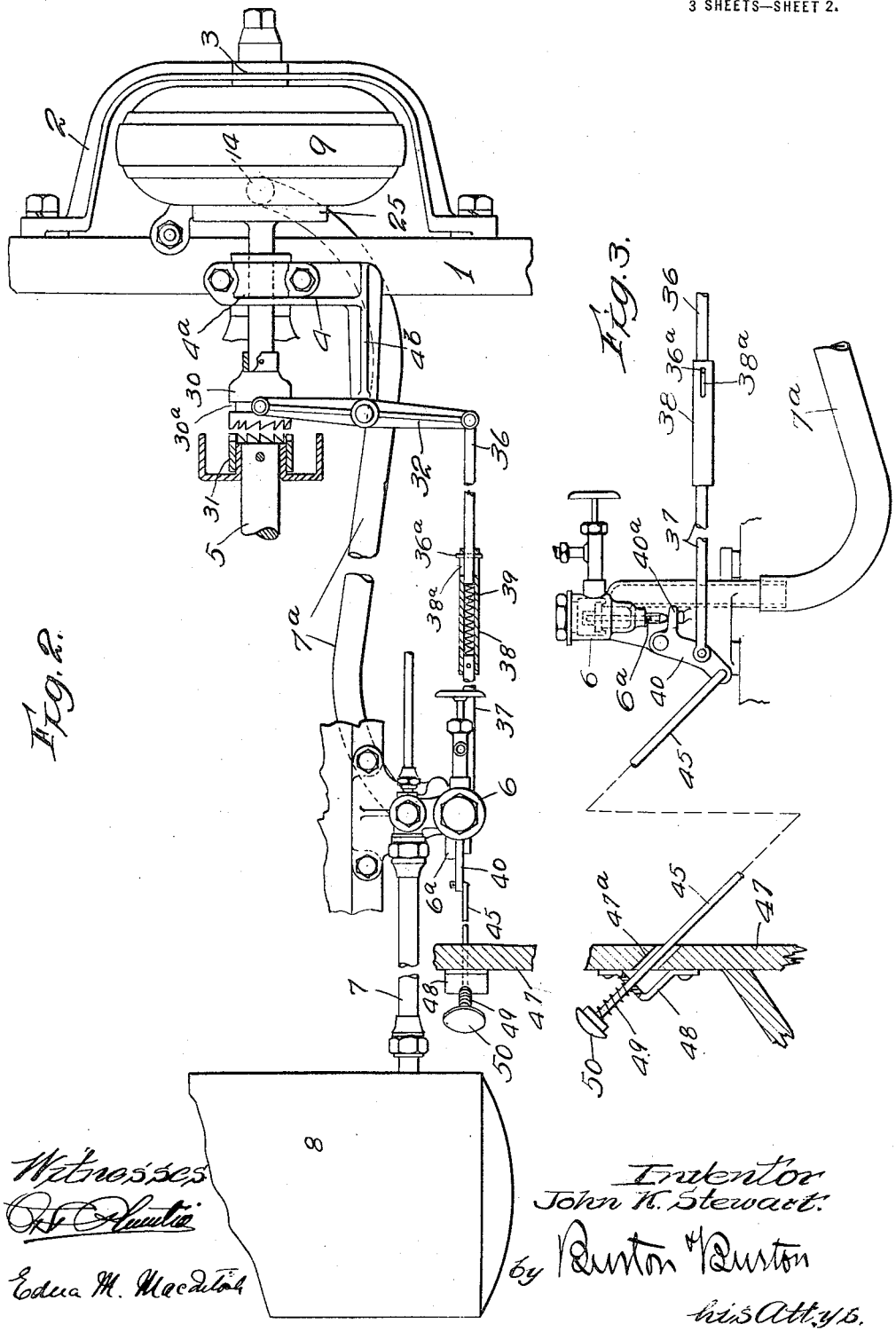

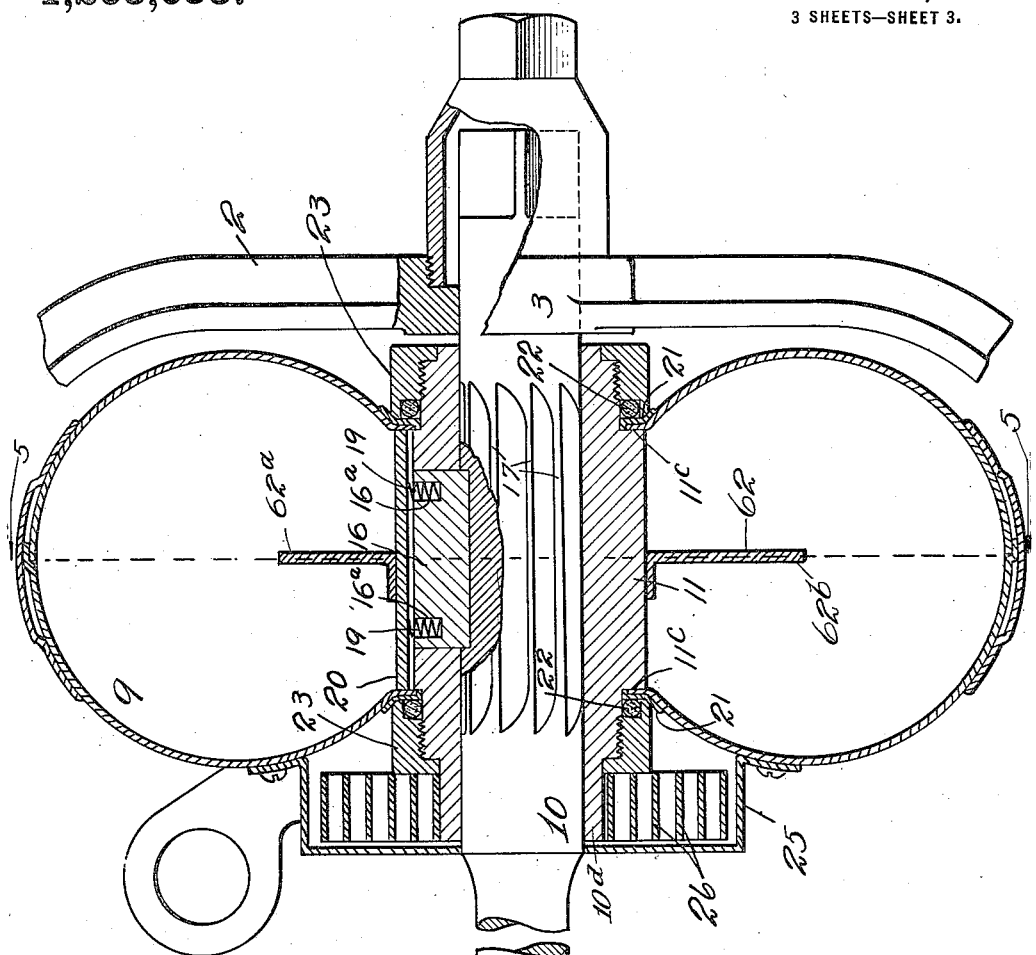

UNITED STATES PATENT OFFICE.

JOHN K. STEWART, OF CHICAGO, ILLINOIS, ASSIGNOR TO STEWART-WARNER SPEEDOMETER CORPORATION, OF CHICAGO, ILLINOIS, A CORPORATION OF VIRGINIA.

AIR-STARTER FOR AUTOMOBILE-ENGINES.

1,205,055.

Specification of Letters Patent.

Patented Nov. 14, 1916.

Application filed August 11, 1915. Serial No. 45,076.

*To all whom it may concern:*

Be it known that I, JOHN K. STEWART, a citizen of the United States, residing at Chicago, in the county of Cook and State of Illinois, have invented new and useful Improvements in Air-Starters for Automobile-Engines, of which the following is a specification, reference being had to the accompanying drawings, forming a part thereof.
The purpose of this invention is to provide an improved construction for the purpose of starting the engine of an automobile by the use of a compressed air motor, or the like.
It consists in the elements and features of construction shown and described as indicated in the claims.

Figure 1:
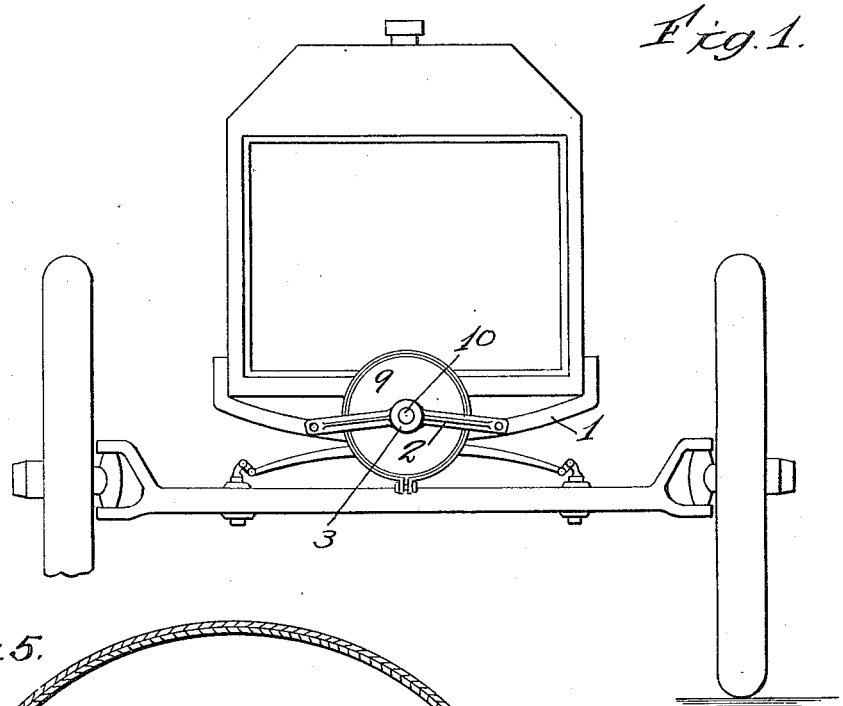
Figure 5:
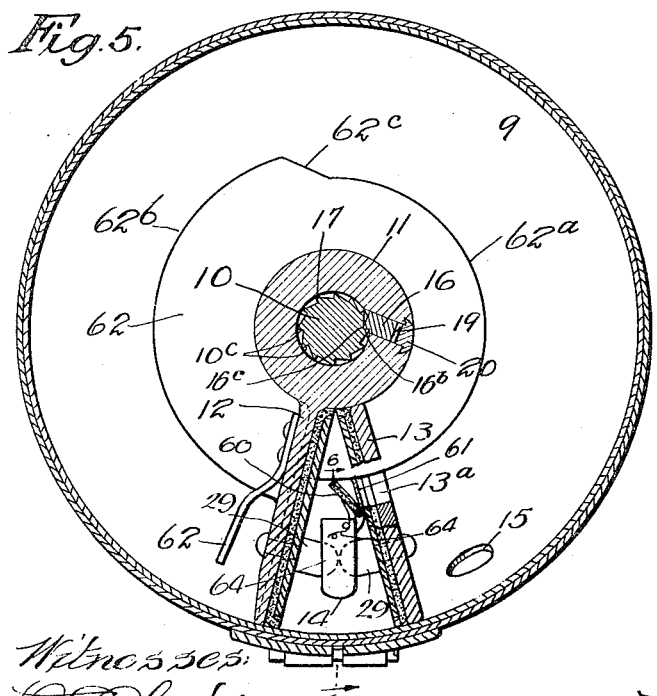
Figure 6:
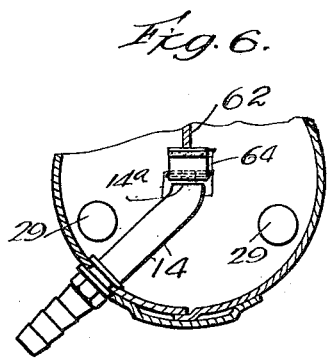

In the drawings: Figure 1 is a front elevation of a portion of an automobile chassis having a structure embodying this invention mounted thereon, in proper relation to the engine parts for performing the function of the device. Fig. 2 is a plan view partly diagrammatic in respect to the distances separating the several elements showing the same construction. Fig. 3 is a side elevation of a portion of the structure shown in Fig. 2, showing in addition the operating connections extending to the dash-board.
Fig. 4 is an axial section of the starting motor. Fig. 5 is a section at the line 5—5, on Fig. 4. Fig. 6 is a section at the line 6—6 on Fig. 5.

In the structure shown in the drawings, the starting motor is designed to have its shaft connected not to the main engine shaft, but to some secondary shaft, as for example, the shaft of the fan-drive pulley. This, however, is a matter of detail and not essential broadly to the invention, and in the claims when reference is made to the engine shaft, it is to be understood that the shaft to which the starting motor is connected is intended without regard to whether it is the main engine shaft or some secondary shaft connected therewith.

In the drawings, 1 represents any fixed member of the shaft, A, or frame upon which the engine is mounted. 2 is a bracket secured to said frame member having a bearing at 3, for the shaft of the starting motor. 4 is a bracket which is also mounted upon the chassis frame member, 1, having another bearing, 4ª, for the starting motor shaft, affording in addition an arm, 4ᵇ, upon which is fulcrumed a lever hereinafter mentioned for operating the clutch which connects the starting motor shaft with the engine shaft.

5 is a shaft of or connected with the engine with which the starting motor shaft is clutched for starting the engine. In the structure shown in the drawings this is the shaft of the fan drive pulley.

6 is a valve which controls the admission of motive fluid to the starting motor by way of the pipe, 7, leading from a compressed air reservoir, 8, to the valve, and the pipe, 7ª, leading from the valve to the motor.

The construction of the starting motor will be described briefly. It is of the somewhat familiar type consisting of an annular casing, 9, through which a shaft, 10, extends axially, a sleeve, 11, mounted for rotation on the shaft and within the casing forming the inner wall of the annular chamber of said casing and carrying a vane, 12, which oscillates in the annular chamber of the casing from one side to the other of a radial partition, 13, in said casing, at one side of which and between the position of the vane when stopped at that side of the partition, the casing has an inlet fitting, 14, for the motive fluid supplied to it through the pipe, 7ª, as above stated, and controlled by the valve, 6, the casing having at the other side of said partition a vent and exhaust port, 15, through which the air in advance of the piston vane in the working stroke of the latter, is driven out, and through which the compressed air at the other side of the vane is exhausted when the vane passes partly by and uncovers that port at the finish of its said working stroke. The sleeve, 11, is engaged with the shaft, 10, by means of a ratchet dog, 16, mounted in the sleeve and engaging ratchet teeth, 17, which are formed preferably in the substance of the shaft, 10, though this is not material so long as they are rigid with the shaft. For the most desirable and effective coöperation of the dog and the ratchet formation of the shaft, the dog is a substantially rectangular oblong metal block having its length in the direction of the length of the shaft and its width somewhat less in thickness than the sleeve, so that the block is lodged in the sleeve in an oblique position, that is to say, leaning from the radial position back in the direction in which the dog tends to drive the shaft. The dog has cavities, 16ª, 16ª, in which are lodged springs, 19, reacting against a stop plate, 20, which is engaged in a dove-tail slot in the surface of the sleeve for retaining the dog and the spring, whereby the springs operate to thrust the dog inward toward the shaft for engagement of its inner end with the ratchet teeth of the shaft. The ratchet teeth have their driving faces, 10ᶜ, substantially radial to the shaft, and the dog has its ratchet-engaging corner provided with a tooth, 16ᶜ formed by a V-shaped recess on the ratchet-tooth-engaging side of the dog which makes the ratchet-tooth-engaging face, 16ᵇ, of the dog also substantially radial with respect to the shaft. This causes said tooth-engaging face to extend in a direction which may be called "undercut" with respect to the direction of slide movement of the dog in entering and withdrawing from the ratchet; and this is a feature which is of value for the purpose of preventing the dog from being thrown out of engagement by centrifugal action when the motor is revolving rapidly.

In respect to the detail construction of the starting motor, it may be noticed that, as above mentioned, the ratchet teeth are formed in the substance of the shaft by grooving it so that the teeth do not at any point project beyond the cylindrical surface of the shaft and do not prevent the sleeve, 11, from completely encompassing the shaft and its ratchet teeth. It will be further noticed that the sleeve is reduced from its largest diameter which it has at the portion intermediate its ends, such reduction forming shoulders, 11ᶜ, against which the two dished annular members of the casing, 9, are stopped as they are respectively advanced onto said sleeve from the opposite ends thereof, and that there are next mounted on the sleeve outside the said two dished members respectively, two pressed steel rings, 21, 21, which are followed by packing rings, 22, 22, and these in turn are followed by the interiorly-threaded collars, 23, 23, which are screwed onto the still further reduced ends of the sleeve and compress the packing so as to make the joints satisfactorily air-tight. At the rear or inner side of the casing forming the annular chamber of the starting motor, the sleeve, 11, protrudes therefrom around the shaft, 10, the protruding portion being inclosed by a spring case or cap, 25, which is itself secured to the rear or inner casing member, and serves for housing and securing the outer end of a spring, 26, whose inner end is secured to the inner end of the sleeve which protrudes within the said spring housing, as seen at 10ᵈ. This spring, 26, thus serves to retract the sleeve around the shaft in the opposite direction from that in which it is driven by the admission of the motive fluid operating on the vane, 12. Said vane, 12, and the radial partition, 13, in the casing are each provided with a bumper, 29, said bumpers protruding so as to encounter each other when the vane is retracted to the position of rest in the casing, as seen in Fig. 5.

Upon the rear or inner end of the shaft, 10, there is secured so as to rotate and move longitudinally with the shaft, a clutch member, 30, which coöperates with the clutch member, 31, mounted upon the forward end of the shaft, 5, of the engine. Upon the arm, 4ᵇ, above mentioned, there is fulcrumed a clutch-shifting lever, 32, having its forked end engaged with the groove, 30ª, of the clutch, 30, the opposite end of the lever being connected by an extensible and reducible link, 36, 37, 38, the two members, 36 and 37, being connected by a coupling sleeve, 38, in which there is a coiled spring, 39, reacting between the two oppositely-inserted ends of the members, 36 and 37, to thrust them apart and thereby extend the link. One of said members, as 36, is connected with the sleeve by a cotter pin, 36ª, sliding in a slot, 38ª, of the sleeve to permit and limit the extension and reduction of the link. The other member, 37, is pinned fast to the sleeve. This extensible and reducible link is connected at its end remote from the lever, 32, to a lever, 40, which operates the valve, 6, being fulcrumed upon the bracket, 6ª, extending from the body of the valve and having a tongue or lever arm, 40ª, engaging the protruding stem of the valve to thrust it in against the resistance provided in the structure of the valve or by the pressure of the air for seating of the latter, and opening said valve when thus operating to thrust it in. To the arm of the lever to which the link member, 37, is connected, there is connected outward from said link-connection, an operating link, 45, which extends in proper direction to terminate in position to be operated by the engine driver, preferably by the foot, for which purpose it is shown extending through an aperture, 47ª, in the dash-board, 47, and retaining the slide bearing in a bracket, 48, at the inner side of the dash-board, above or beyond which there is a spring, 49, reacting against the pedal or head-piece, 50, of the lever for retracting the lever upward and inward to retract the lever, 40, to permit the air-controlling valve to be reversed to position for cutting off the air supply and permitting exhaust through the port, 6ª, in the return or idle movement of the pawl, 12, as may be understood from the drawings without particular description. The spring, 49, is designedly strong enough to retract all the parts connected as described, including the final element, namely, the shaft, 10, and clutch member, 30, which will thereby be withdrawn from engagement with the clutch member, 31, when the driver lifts his foot from the pedal, 50.

To prevent waste of the compressed air and provide a cut-off at the point considered desirable in the stroke of the vane, there is provided a shut-off valve, 60, hinged to the end of the inlet fitting, 14, to close the port, 14$^a$, said valve having a spring lever arm, 61, which acts also as a valve to close a gap, 13$^a$, which is formed in the partition, 13, to accommodate an annular disk cam, 62, which is carried by the sleeve, 11, and has its periphery comprising two concentric portions, 62$^a$ and 62$^b$, of different diameters, connected by a sloping cam shoulder, 62$^c$, which is positioned at such number of degrees around from the vane, 12, as is judged to be the desirable point for cut-off of the motive fluid. When the cam shoulder reaches the partition and passes through it, it encounters the spring lever arm, 61, of the valve, 60, and swings the valve shut, the elasticity of the lever arm serving to insure the seating of the valve and compensating for some wear of the parts. When the vane retreats there is opened a small gap in the partition, 13, equal to the difference in diameter of the two portions, 62$^a$ and 62$^b$, of the disk, but when the compressed air is next admitted through the inlet, it will strike the valve, 60, and swing its spring arm, 61, which is also a valve, around against the partition, and close up this gap, and the compressed air will thereafter hold it firmly closed until it is again opened by the cam. If desired a light spring, 64, may be provided acting upon the valve to hold it normally open and the spring arm, 61, normally seated for closing the gap. The operator should release the pedal, 50, promptly after having depressed it to open the valve, 6, and admit a charge of compressed air; but should he fail to do so, the waste of air which would otherwise occur through the exhaust port, 15, will be prevented by the cut-off device above described; and later release of the pedal will cause the main air-controlling valve, 6, to be reversed to shut off the air supply from the reservoir and permit exhaust to occur through the exhaust-port, 6$^a$, which is provided in the construction of that valve, as above stated.

The operation of the structure above described may be understood from the foregoing description, but may be further stated briefly. Compressed air being by any suitable means provided in the reservoir, 8, when the driver desires to start his engine, he will press the pedal, 50, thrusting the link, 45, downward and forward causing it first to operate the valve lever, 40, to open the valve and admit compressed air to the starting motor. In this operation the links, 36, 37, 38, will be thrust longitudinally, whereupon the resistance to its movement due to the friction of the parts will cause the spring, 39, to be compressed in that action to a small extent, delaying the movement of the clutch member, 30, so that the air will be admitted to the motor before the clutch will be engaged; but the clutch will be engaged by the same stroke of the foot of the operator upon the pedal, 50. If it should chance that the teeth of the two clutch members, 30 and 31, should be positioned so as to meet point to point and not in proper engagement, the yielding of the spring, 39, and the consequent reduction of length of the lever, 36, 37, 38, will accommodate the action so that the collision of the clutch teeth will not prevent the air valve from being opened by the completion of the proper movement of the lever, 40; and as soon as the starting motor starts the rotation of the clutch member, 30, will bring it into proper engagement with the clutch member, 31, and the spring, 39, causing said clutch member, 30, to follow up into complete engagement with its companion member, 31.

It will be understood that upon the initial action of the starting motor, the sleeve, 11, will give the shaft, 10, a little less than one rotation and no more (except under the acquired momentum), upon once opening the valve, 6. If the engine does not start under this impulse the driver will repeat the pedal stroke as often as necessary until the engine starts. It will be observed that as soon as the engine starts, so that its shaft is running under its own power, if the operator should be still holding down the pedal, 50, and thereby holding the clutch members, 30 and 31, engaged, and if the engagement should be sufficient to cause the member, 31, to drive the member, 30, such rotation of the shaft, 10, would be accommodated by the idling of the dog, 16, on the ratchet, 17, of the shaft.

For starting the engine by a crank in the usual manner when it is equipped with this air starter but the same is not in service, or when the amount of compressed air in the reservoir is not supposed to be sufficient to effect the starting, the shaft, 10, which protrudes at the forward end of the bracket, 2, and is there squared for receiving a crank, is thrust in by the crank which is applied to it, to engage the clutch members, 30 and 31, and then rotated by the crank to start the engine in the usual manner. If there should be any compressed air in the reservoir which might assist the starting action, it will be observed that the in-thrusting of the shaft, 10, will cause the clutch-operating connections to be operated reversely, that is, from the clutch end instead of from the pedal end, with the effect of opening the valve, 6, precisely as if the driver had depressed the pedal, 50, and the starting motor may be operated to some extent by compressed air to assist the starting action.

One advantage of the construction shown is that if in any instance when starting the engine by a crank, it should receive an impulse in the wrong direction, no injury can be done to the operator who is holding the crank, because the reverse rotation of the shaft, 10, is absolutely prevented by the engagement of the dog, 16, with the ratchet, 17, on the shaft in view of the fact that the sleeve in which the dog is mounted has its vane, 12, stopped against the radial partition, 13, in the casing, 9, and the shaft cannot start without tearing the casing loose from its anchorage on the frame, which as well as the casing is sufficiently strong to prevent this action and hold the shaft against the impulse of the single improperly timed explosion which may occur.

I claim:—

1. In combination with a revoluble shaft, a casing forming an annular chamber about the shaft; a sleeve on the shaft rotatable relatively to both the shaft and the casing; a ratchet dog carried by the sleeve, the shaft having coöperating ratchet formation for engagement by the dog; a second shaft axially alined with the first mentioned shaft, and coöperating clutch members on the two shafts adapted for engagement and disengagement by longitudinal movement of one shaft relatively to the other; the first mentioned shaft being longitudinally movable through the sleeve, the dog and ratchet being adapted to permit such longitudinal movement without disengagement of the dog from the ratchet.

2. A starting mechanism for an automobile engine, in combination with a support rigid with the engine supports; a revoluble shaft journaled in said support; a casing forming an annular chamber about the shaft, and also rigid with the support; the shaft being protruded from the support and adapted for crank engagement; a sleeve on the shaft rotatable relatively to both the shaft and the casing; a ratchet dog carried by the sleeve, the shaft having ratchet formations for engagement of the dog; a vane fast on the sleeve for oscillation around the shaft in the annular chamber, the chamber having a partition which stops the vane at the opposite limits of its oscillatory movement, and means tending to turn the vane to and hold it at the limit from which it moves for driving engagement of the dog with the ratchet; whereby the vane has that position at rest and reverse rotation of the shaft from that position is prevented by the engagement of the dog with the ratchet.

3. In combination with a revoluble shaft, a casing forming an annular chamber about the shaft; a sleeve on the shaft rotatable relatively to both the shaft and the casing; a dog carried by the sleeve, the shaft having ratchet formation for engagement of the dog, said dog consisting of a substantially rectangular oblong block mounted for sliding in the sleeve in the direction of its width, the slide path of the dog in the sleeve being inclined from radial direction so that the dog leans slightly forward in the direction of rotation, the ratchet teeth having their driving faces substantially radial to the shaft, and the dog having its ratchet-tooth-engaging face also radial to the shaft, the dog being recessed at the driving side to form thereon a terminal tooth, and the ratchet teeth being shaped and protruded in the direction for entering the recess and engaging the tooth.

4. In an automobile engine starting device, in combination with an oscillatory motor comprising a rotatable shaft and an oscillatory member having a one-way-driving engagement with the shaft, such shaft being mounted for longitudinal movement for engagement with and disengagement from the engine shaft; a clutch member which is mounted on the shaft for such engagement and disengagement; means by which the shaft is shifted longitudinally to engage and disengage the clutch; a valve which controls the admission of motive fluid to the motor device; a movable member which operates said valve; a changeable-length link connecting said member with the shaft operating means, comprising a spring which tends yieldingly to hold said link at one limit of its length, and means operable at will to move said valve-operating member, the connection being such that the movement of said member for opening the valve moves the link in the direction for engaging the clutch and changing the link length.

5. In combination with an internal combustion motor, a starting device for the same consisting of an oscillatory motor having its casing mounted fixedly with respect to the motor to be started, and comprising a shaft rotatably mounted, and a member adapted to be actuated by an expansive fluid for rotating the shaft; a clutch member on the shaft for engagement of the latter with the engine shaft; a valve which controls the admission of motive fluid to the motor; means for shifting the clutch for engagement with and disengagement from the engine shaft; a lever device for operating the valve; an extensible and reducible link connecting said lever device with the clutch-operating means; said link comprising a spring tending yieldingly to hold it at one limit of its range of extensibility, and means operable at will for moving said valve lever device.

6. In combination with an engine-starting motor, comprising a rotatable shaft; a clutch on the shaft adapted for engagement with the engine shaft; a valve which controls the admission of motive fluid to the starting motor; a clutch-shifting lever; a valve-operating lever; a link which connects said levers which is yieldingly reducible in length, comprising a spring tending to extend it to its limit; the connections being such that the valve-opening movement of the valve-operating lever thrusts the link for operating the clutch in the direction for its engagement; whereby the link is reduced in length in such movement upon the clutch encountering resistance to its engaging movement; and means for operating at will the valve-operating lever.

7. In combination with an engine-starting motor, comprising a rotatable shaft; a clutch on the shaft adapted for engagement with the engine shaft; a valve which controls the admission of motive fluid to the starting motor; a clutch-shifting lever; a valve-operating lever; a link which connects said levers which is yieldingly reducible in length, comprising a spring tending to extend the link to its limit; the connections being such that the valve-opening movement of the valve-operating lever thrusts the link for operating the clutch in the direction for its engagement; whereby the link is reduced in length in such movement upon the clutch encountering resistance to its engaging movement; a link connected to the valve-operating lever for operating the same by a longitudinal thrust of the link, and a spring operating upon said last mentioned link to retract the same.

In testimony whereof I have hereunto set my hand at Chicago, Ill., this 22nd day of July, 1915.

JOHN K. STEWART.

Witnesses:
Lucy I. Stone,
Edna M. MacIntosh.